(12) United States Patent
Willingham et al.

(10) Patent No.: US 10,986,814 B2
(45) Date of Patent: Apr. 27, 2021

(54) SPINNABLE PET TOY

(71) Applicants: LeeBob Willingham, Mount Vernon, IL (US); Trevor Jensen, Sa Diego, CA (US)

(72) Inventors: LeeBob Willingham, Mount Vernon, IL (US); Trevor Jensen, Sa Diego, CA (US)

( * ) Notice: Subject to any disclaimer, the term of this patent is extended or adjusted under 35 U.S.C. 154(b) by 399 days.

(21) Appl. No.: 15/997,681

(22) Filed: Jun. 4, 2018

(65) Prior Publication Data
US 2018/0343833 A1 Dec. 6, 2018

Related U.S. Application Data

(60) Provisional application No. 62/514,443, filed on Jun. 2, 2018.

(51) Int. Cl.
*A01K 15/02* (2006.01)

(52) U.S. Cl.
CPC .................. *A01K 15/025* (2013.01)

(58) Field of Classification Search
CPC .... A01K 15/025; A01K 15/026; A01K 15/02; A01K 15/00; A01K 15/021; A01K 15/027; A01K 29/00; A63H 1/10; A63H 1/32; A63H 13/00
USPC ......... 119/706–711, 51.01; 446/226, 236, 46
See application file for complete search history.

(56) References Cited

U.S. PATENT DOCUMENTS

| | | | | |
|---|---|---|---|---|
| 2,187,493 | A * | 1/1940 | Taylor | A63B 65/00 473/609 |
| 3,140,954 | A * | 7/1964 | Schroeder | A63H 27/12 426/104 |
| 4,309,038 | A * | 1/1982 | Spoon | A63B 65/00 273/146 |
| 4,766,848 | A * | 8/1988 | Rocco | A01K 1/04 119/701 |
| D396,253 | S * | 7/1998 | Beecher | D21/406 |
| 6,112,703 | A * | 9/2000 | Handelsman | A01K 15/026 119/707 |
| 6,217,408 | B1 * | 4/2001 | Willinger | A01K 15/025 119/707 |
| D441,506 | S * | 5/2001 | Flynn | D30/160 |
| 6,579,145 | B1 * | 6/2003 | Maxim | A63B 43/00 446/4 |
| 7,211,282 | B2 * | 5/2007 | Straus | A23G 3/50 426/104 |
| D554,811 | S * | 11/2007 | Rutherford | D30/160 |
| 8,087,387 | B2 * | 1/2012 | Gamble | A01K 15/026 119/707 |
| D700,755 | S * | 3/2014 | Reiss | D30/160 |
| D709,561 | S * | 7/2014 | Baumann | D21/398 |
| D712,602 | S * | 9/2014 | Chen | D30/160 |
| 9,301,496 | B2 * | 4/2016 | Reiss | A01K 15/025 |
| D755,446 | S * | 5/2016 | Hansen | D30/121 |
| D758,024 | S * | 5/2016 | Setser | D30/160 |
| D779,136 | S * | 2/2017 | Eisenbarth | D30/160 |
| D822,294 | S * | 7/2018 | Holcomb | D30/160 |

(Continued)

*Primary Examiner* — Yvonne R Abbott-Lewis
(74) *Attorney, Agent, or Firm* — Patrick Mixon

(57) ABSTRACT

A spinnagle pet toy is taught which comprises at least three equally displace appendages projecting out from a central hub. The pet toy appendages may include weighted ends to facilitate angular rotation of the pet toy. The pet toy weighted ends may include cavities, but all preferably weighted equally.

13 Claims, 4 Drawing Sheets

(56) References Cited

U.S. PATENT DOCUMENTS

| | | | | |
|---|---|---|---|---|
| D853,058 S | * | 7/2019 | Cox | D30/160 |
| D853,495 S | * | 7/2019 | Muellenberg | D21/498 |
| 2001/0029904 A1 | * | 10/2001 | Viola | A01K 15/025 |
| | | | | 119/707 |
| 2004/0005841 A1 | * | 1/2004 | Chernick | A63H 33/22 |
| | | | | 446/242 |
| 2014/0202396 A1 | * | 7/2014 | Hansen | A01K 15/025 |
| | | | | 119/710 |
| 2015/0336020 A1 | * | 11/2015 | Levy | A63H 13/00 |
| | | | | 446/485 |
| 2020/0128791 A1 | * | 4/2020 | Nolan | A01K 15/02 |

* cited by examiner

SPINNABLE PET TOY

RELATED APPLICATION

The present application claims priority to U.S. Provisional Application No. 62/514,443, titled "A Spinnable Pet Toy," filed Jun. 2, 2017, with is commonly invented by the inventor and owner of this application.

FIELD OF INVENTION

This invention relates to a pet toy. More specifically, the present invention relates to a spinnable pet toy that promotes increased interaction between toy and pet.

BACKGROUND OF THE INVENTION

Pet owners are increasingly including pets as members of the family. As such, pet owners are increasing concerned about the overall wellbeing of the pet, which includes insuring that the pet has adequate amusement and exercise. A typical solution for pet owner's concerns is a pet toy which may excite the pet's interests and cause the pet to exert physical energy in playing with it.

Conventional pet toys have often added levels of complexity in their design to amuse the pet. However, the added complexity usually results in a reduced life for the toy and/or increased For example, U.S. Pat. No. 7,513,220 titled "Whirling wheel toy", issued Apr. 7, 2009 to Ragonetti, et al, teaches a throwable pet toy that creates an interest for a pet when it strikes the ground. The invention whirls when it hits the ground. The body of the toy is deformable upon impact. However, the invention is complicated in that it uses two different domed structures to capture the ambient air and facilitate whirling, and a deformable outer shell that must be reformed before use. Having to reform the body is an inconvenience to the pet owner.

The Dizzy Thin Electronic Spinning Cat Toy, currently being sold by Petlinks is another attempt at amusing and exercising a pet that adds complexity that diminishes the durability of the toy. In this case, the Dizzy Thin toy features a weighted base attached to an upwardly projecting rod. The rod includes tethered discs which are rotated by a motor located in the base. The toy has its shortcoming in that it is electronic and prone to failure especially if it comes in contact with liquid. Also, since the rotating discs are tethered to the rod projecting from the base, the discs may be easily ripped off by an overly eager pet. Both shortcomings result in the Dizzy Thin toy requiring repair or in the toy having a reduced useful life.

Both the aforementioned prior arts exhibit problems typically found in pet toys that provide amusement and exercise. What is needed is a pet toy that addresses the problems of complexity and durability found in the prior.

SUMMARY OF THE INVENTION

The present invention discloses a pet toy have a central hub and at least three equally displaced appendages projecting therefrom. The present invention teaches pet toy made of a single molded material, comprising a central hub, a first pet toy arm projecting outwardly from the central hub, a second pet toy arm projecting outwardly from the central hub, and a third pet toy arm projecting outwardly from the central hub, wherein the angle formed by the first pet toy arm and the second pet toy arm is substantially equal to the angle formed by the second pet toy arm and third pet toy arm, and the angle formed by the first pet toy arm and the third pet toy arm is substantially equal to the angle formed by the first pet toy arm and the second pet toy arm. The pet toy of the invention may further comprise a first pet toy arm end formed at a distal end of the first pet toy arm, a second pet toy arm end formed at a distal end of the second pet toy arm, and a third pet toy arm end formed at a distal end of the third pet toy arm.

One pet toy arm and arm end of the present invention may be substantially equal in weight to any other of the pet toy arm and arm ends included in the invention. This ensure that the pet toy arms and arm ends are equally balanced around the central hub. Moreover, the central hub if formed such that a portion of the central hub lies in a different plane than the pet toy arms and arm ends, which permits the pet toy to be freely rotated on the hub as the central axis around which the arms and arm ends rotate.

BRIEF DESCRIPTION OF DRAWINGS

A more complete understanding of the present invention may be derived by referring to the various embodiments of the invention described in the detailed descriptions and drawings and figures in which like numerals denote like elements, and in which.

DETAILED DESCRIPTION OF THE PREFERRED EMBODIMENTS

Figure 1:
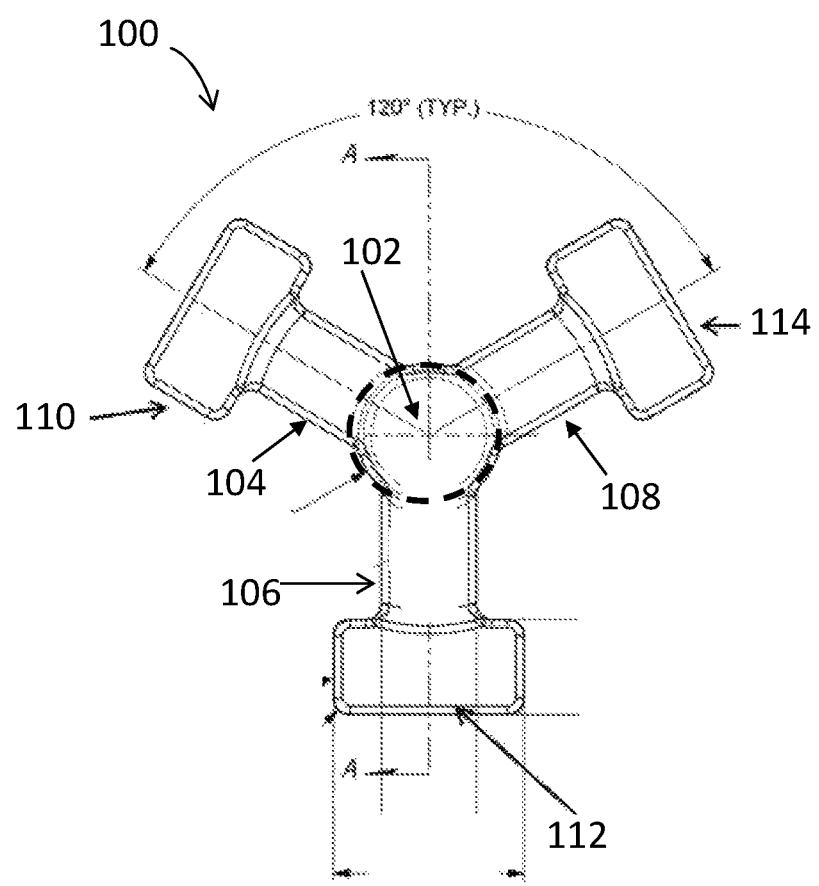
FIG. 1 is a top view of a spinnable pet toy in accordance with various exemplary embodiments of the present invention.

The brief description of exemplary embodiments of the invention herein makes reference to the accompanying drawings, which illustrate various exemplary embodiments of the invention and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the description herein is presented for purposes of illustration only and not of limitation.

FIGS. 1-4 depicts an exemplary embodiment of pet toy 100 constructed in accordance with the invention. In one exemplary embodiment, pet toy 100 may be molded as a single, homogeneous, one-piece molding. In this manner, pet toy 100 may require no assembly.

In another exemplary embodiment, pet toy 100 may comprise several distinct pieces removably joined to form a unitary toy, wherein like pieces of pet toy 100 are substantially equally weighted or contain substantially the same mass. In another embodiment, pet toy 100 is constructed of inflexible or rigid material. In yet another exemplary embodiment, pet toy 100 may be formed from, wood, metal, a plastic or elastomeric material such as synthetic or natural rubber Pet toy 100 may include a material central hub 102 serving as the central axis of rotation from which a first arm 104, second arm 106 and a third arm 108 are radially projected. Each pet toy arm 104, 106, 108 is projected outwardly equidistant from each other. Pet toy arms 104, 106, 108 comprise substantially equally weighted material. In an typical embodiment, pet toy arms 104, 106, 108 are elongated in shape.

In another exemplary embodiment, each of the pet toy arms 104, 106, 108 may be formed with a a first arm end 110, second arm end 112, and third arm end 114 comprising a material mass. The material mass (arm end) may be located substantially at the distal end of each of pet toy arms 104, 106, 108. In preferred embodiments, first arm end 110, second arm end 114 and third arm end 114 may be substantially equally weighted. As used herein, the distal end of pet toy arms 104, 106, 108 is the end located opposite central hub 102.

As noted, in one exemplary embodiment, first arm 104, second arm 106 and third arm 108 are formed equal distant from the other. For example, as is shown, first arm 104 is formed substantially 120 degrees from third arm 108; second arm 106 may be formed substantially 120 degrees from third arm 108; and first arm 104 may be formed substantially 120 degrees from second arm 106.

During operation, central hub 102 may be placed in contact with a hard, flat surface. Preferably, the surface is substantially horizontal. Pet toy 100 may then be twirled or spinned on its central hub 102. First arm end 110, second arm end 112, and third arm end 114 may be of sufficient weight (e.g., mass) to generate sufficient centrifugal force to maintaining even angular rotation of pet toy 100 around central hub 102, as described more fully below.

In one exemplary embodiment, arm end 110 may be substantially oblong in shape. In such an instance, first arm end 110 may be affixed to first arm 104 such that the first arm end 110 central axis is substantially perpendicular to the radially extending first arm 104. In another exemplary embodiment, second arm end 112 may be affixed to second arm 106 such that the second arm end 112 central axis is substantially perpendicular to the radially extending second arm 106. In yet another exemplary embodiment, third arm end 114 may be affixed to third arm 108 such that the third arm end 114 central axis is substantially perpendicular to the radially extending third arm 108.

In another exemplary embodiment, the mass of each arm end 110, 112, 114 may be distributed so as to aid in angular rotation of pet toy 100. In another exemplary embodiment, the mass of arm end 110 is substantially equal to the mass of arm end 112, and the mass of arm end 112 is substantially equal to the mass of arm end 114. In this way, each arm end 110, 112, 114 ensures that pet toy 100 remains balanced when the toy is rotating.

In yet another exemplary embodiment, the sum of the mass of first arm 104 and the mass of first arm end 110 is substantially equal to (or equal to) the sum of mass of second arm 106 and second arm end 112, and the sum of the mass of second arm 106 and the mass of second arm end 112 is substantially equal to (or equal to) the sum mass of third arm 108 and third arm end 114.

Figure 2:
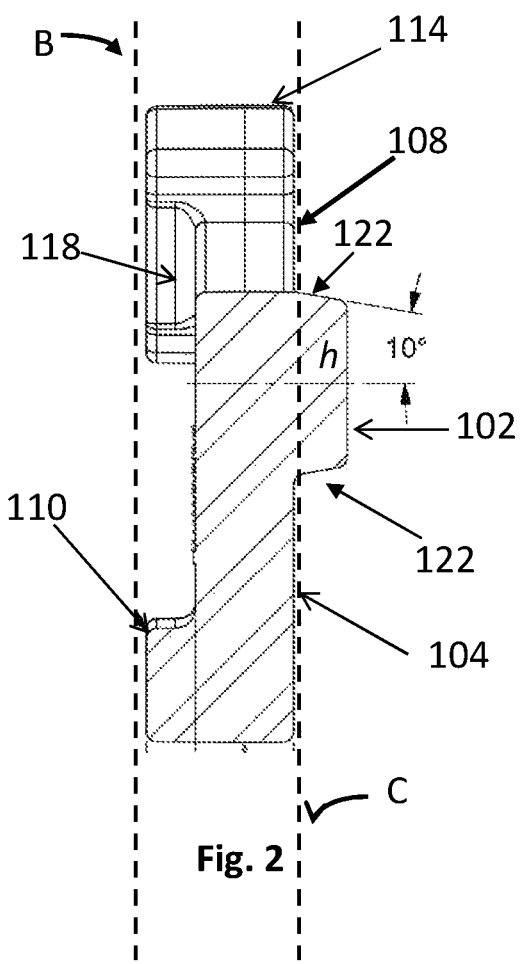
FIG. 2 is a first side view of the spinnable pet toy in accordance with various exemplary embodiments of the present invention.

FIG. 2 depicts a first side view of pet toy 100 in accordance with exemplary embodiments of the present invention. As shown, first side arm end 110, second arm end 112 (not shown), and third arm end 114 rest between a first and second plane shown by lines B and C drawn perpendicular to the central axis of central hub 102.

Central hub 102 may project a distance, h, from second plane C, along central hub 102 axis. Central hub 102 may be formed such that pet toy 100 may be rest upright when balanced placed on central hub 102. That is, at least one surface of central hub 102 may be flat and perpendicular to the central axis of central hub 102 In one exemplary embodiment, central hub 102 may be tapered. As shown, central hub 102 may be tapered for example, at 10 degrees. It should be noted, however, that additionally narrow tapers are contemplated in the invention.

Figure 3:
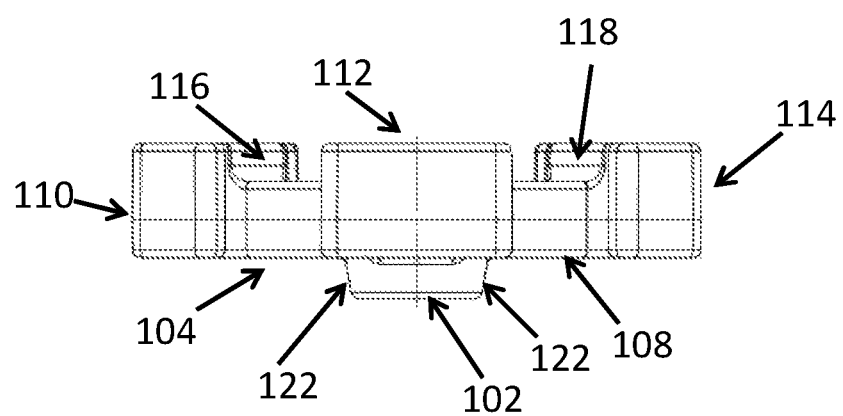
FIG. 3 is a second side view of the spinnable pet toy in accordance with various exemplary embodiments of the present invention.
Figure 4:
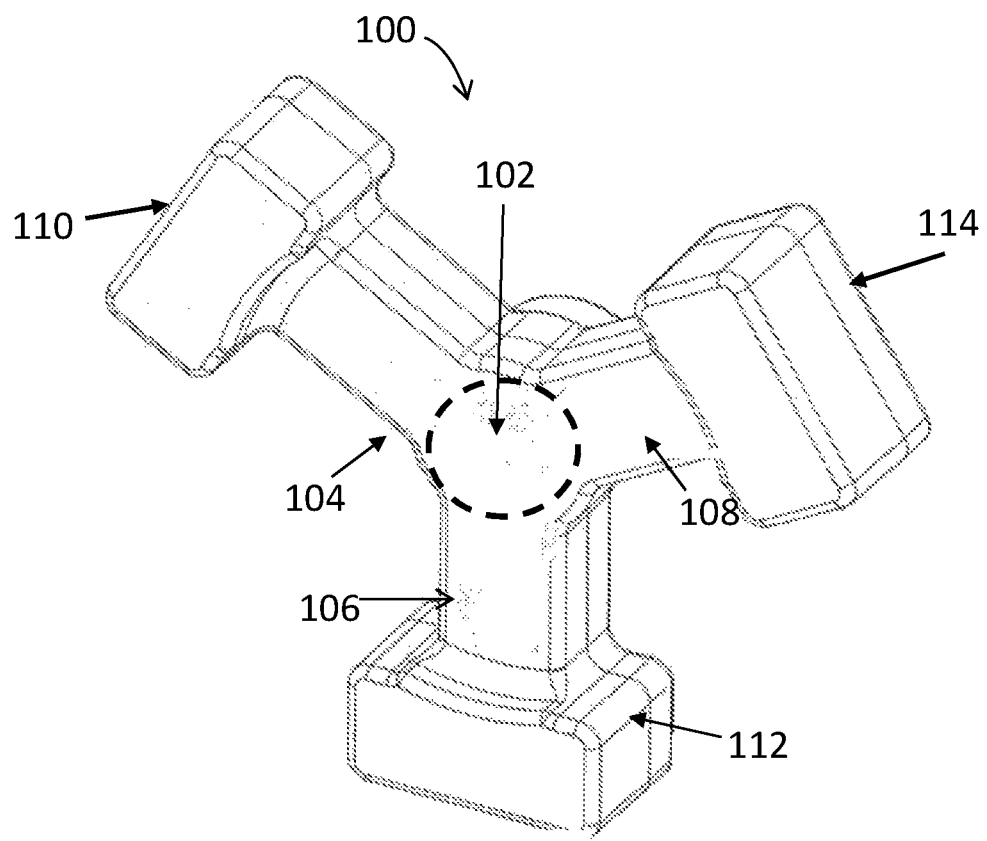
FIG. 4 is a perspective view of the spinnable pet toy in accordance with various exemplary embodiments of the present invention.

It should be further noted that first arm end 110, second arm end 112, and third arm end 114 may be comprised of the same or substantially similar quantity of mass. As shown in FIG. 3, first arm end 110 may be formed such that it has a first arm end cavity 116 therein. Similar, third arm end 114 may also include a third arm end cavity 118. In such an instance, first arm end cavity 116 may be of substantially the same, or the same, size and shape as third arm end cavity 118. Moreover, where second arm end 112 includes a second arm end cavity (not shown), second arm end cavity will be substantially similar to, or similar to, arm end cavity 116 and arm end cavity 118. By cavity what may be meant is that the arm end may include less material as when compared to the arm to which it is attached or formed. That is, a cavity may represent an absence of material or a cutout of material relative to the arm to which the end is attached.

During operation, pet toy 100 may be place on a firm surface with the tapered end of central hub 102 in firm contact therewith. Since central hub 102 is tapered, and the pet toy arms and arm ends are mass balanced, pet toy 100 may be fairly balanced on central hub 102 tapered end. Pet toy 100 may then be forcibly rotated on central hub 1023. The force may be exerted by the human hand or a pet's paw. Moreover, once pet toy 100 is rotated on central hub 102, the balanced nature of the pet toy arms and arm ends ensures that pet toy 100 rotates evenly about central hub 102 axis. Further still, first arm end 110, second arm end 112, and third arm end 114 provide rotation sustaining centrifugal force when pet toy 100 is rotated.

It should be noted that although the present invention is described with respect to a single molded form pet toy, pet toy 100 may be constructed of distinct pieces which may be joined together to form pet toy 100. For example, central hub 102 may be distinct element apart from pet toy arms 104, 106, 108 and first, second and third arm ends 110, 112, 114. In another example, a pet toy arms 104 and first arm ends 110 may be a solitary unit forming a single element of pet toy 100. In such a case, central hub 102 may be a distinct element of pet toy 100 apart from the pet toy arms 104 and first arm ends 110 combined unit.

Where the elements of pet toy 100 are distinct, they may be affixed in the arrangement discussed regarding the single molded pet toy 100 embodiment. That is, first arm end 110 may be affixed to first pet toy arm 104 using for example any conventional means for affixing the material used. For example, the means for affixing may be an adhesive, a screw, rivet, or the like. In another exemplary embodiment, pet toy arms 104 and first arm ends 110 may be formed so that they may be affixed by mating one part to the other. Additionally, pet toy arm 104 may be affixed to central hub 102 using any convention means for affixing, as was described above. The method of operation of the pet toy embodiment having distinct elements proceeds in the same manner as the molded pet toy embodiment.

It should be appreciated by one skilled in art, that the foregoing description has been directed to specific embodiments of this invention. It will be apparent, however, that other variations and modifications may be made to the described embodiments, with the attainment of some or all of their advantages. For example, it should be appreciated that first, second and third arms of the pet toy of the present invention may include channels or cavities such that they use less mass in their construction. Therefore, it is intended that the present invention to cover all such obvious variations and modifications within the true spirit and scope of the invention.

What is claimed is:

1. A pet toy made of a single molded material, comprising
   a. a central hub, the central hub including a central hub central axis,
   b. an elongated first pet toy arm projecting radially outwardly from the central hub, the elongated first pet toy arm having a distal end and a proximal end, wherein the first pet toy arm proximal end is in communication with the central hub,
   c. an elongated second pet toy arm projecting radially outwardly from the central hub, the elongated second pet toy arm having a distal end and a proximal end, wherein the second pet toy arm proximal end is in communication with the central hub,
   d. an elongated third pet toy arm projecting radially outwardly from the central hub, wherein the angle formed by the first pet toy arm and the second pet toy arm is substantially equal to the angle formed by the second pet toy arm and third pet toy arm, and the angle formed by the first pet toy arm and the third pet toy arm is substantially equal to the angle formed by the first pet toy arm and the second pet toy arm, the elongated third pet toy arm having a distal end and a proximal end, wherein the third pet toy arm proximal end is in communication with the central hub,
   e. an elongated first pet toy arm end in communication with the elongated first pet toy arm distal end, the elongated first pet toy arm end having a first pet toy arm end central axis, wherein the first pet toy arm end central axis is perpendicular to elongated first pet toy arm,
   f. an elongated second pet toy arm end in communication with the elongated second pet toy arm distal end, the elongated second pet toy arm end having a second pet toy arm end central axis, wherein the second pet toy arm end central axis is perpendicular to elongated second pet toy arm, and
   g. an elongated third pet toy arm end in communication with the elongated third pet toy arm distal end, the elongated third pet toy arm end having a third pet toy arm end central axis, wherein the third pet toy arm end central axis is perpendicular to elongated third pet toy arm.

2. A pet toy made of single molded material according to claim 1, wherein the elongated first pet toy arm end is oblong shaped, and wherein the central axis of the elongated first pet toy arm end is formed perpendicular to the central axis of the central hub.

3. A pet toy made of single molded material according to claim 2, wherein the elongated first pet toy arm end includes a cavity.

4. A pet toy made of single molded material according to claim 2, wherein the central hub is tapered.

5. A pet toy made of single molded material according to claim 2, wherein the central hub is tapered.

6. A spinnable pet toy comprising,
   a. a central hub, the central hub having a central axis,
   b. an elongated first pet toy arm removably affixed to the central hub, the elongated first pet toy arm having a distal end and a proximal end, wherein the elongated first pet toy proximal end is removably connected to the central hub,
   c. an elongated second pet toy arm removably affixed to the central hub, the elongated second pet toy arm having a distal end and a proximal end, wherein the elongated second pet toy proximal end is removably connected to the central hub, and
   d. an elongated third pet toy arm projecting outwardly from the central hub, wherein the elongated first pet toy arm, the second pet toy arm, and the third pet toy arm each project an equal distance from the central hub, and wherein the angle formed by the first pet toy arm and the second pet toy arm is substantially equal to the angle formed by the second pet toy arm and third pet toy arm, and the angle formed by the first pet toy arm and the third pet toy arm is substantially equal to the angle formed by the first pet toy arm and the second pet toy arm, wherein the elongated third pet toy arm having a distal end and a proximal end, wherein the elongated third pet toy proximal end is removably connected to the central hub
   e. an elongated first pet toy arm end affixed to the elongated first pet toy arm distal end, the elongated first pet toy arm end having a first pet toy arm end central axis, wherein the first pet toy arm end is affixed to the elongated first pet toy arm distal end such that the first pet toy arm end central axis is perpendicular to elongated first pet toy arm,
   f. an elongated second pet toy arm end affixed to the elongated second pet toy arm distal end, the elongated second pet toy arm end having a second pet toy arm end central axis, wherein the second pet toy arm end is affixed to the elongated second pet toy arm distal end such that the second pet toy arm end central axis is perpendicular to elongated second pet toy arm, and
   g. an elongated third pet toy arm end affixed to the elongated third pet toy arm distal end, the elongated third pet toy arm end having a third pet toy arm end central axis, wherein the third pet toy arm end is affixed to the elongated third pet toy arm distal end such that the third pet toy arm end central axis is perpendicular to elongated third pet toy arm.

7. A spinnable pet toy according to claim 6, wherein the first pet toy arm end is oblong shaped, and wherein the first pet toy arm end is affixed such that the first pet toy arm end central axis is perpendicular to the central axis of the central hub.

8. A spinnable pet toy claim 7, wherein the first pet toy arm end includes a cavity.

9. A spinnable pet toy according to claim 7, wherein the central hub is tapered.

10. A spinnable pet toy comprising,
    a. a central hub, the central hub having a central axis,
    b. an elongated first pet toy arm removably affixed to the central hub, the elongated first pet toy arm having a distal end and a proximal end, wherein the elongated first pet toy proximal end is removably connected to the central hub,
    c. an elongated second pet toy arm removably affixed to the central hub, the elongated second pet toy arm having a distal end and a proximal end, wherein the elongated second pet toy proximal end is removably connected to the central hub, and d. an elongated third pet toy arm projecting outwardly from the central hub, wherein the elongated first pet toy arm, the second pet toy arm, and the third pet toy arm each project an equal distance from the central hub, and wherein the angle formed by the first pet toy arm and the second pet toy arm is substantially equal to the angle formed by the second pet toy arm and third pet toy arm, and the angle formed by the first pet toy arm and the third pet toy arm is substantially equal to the angle formed by the first pet toy arm and the second pet toy arm, wherein the elongated third pet toy arm having a distal end and a proximal end, wherein the elongated third pet toy proximal end is removably connected to the central hub e. a rectangular first pet toy arm end affixed to the elongated first pet toy arm distal end, the rectangular first pet toy arm end having a rectangular first pet toy arm end central axis, wherein the rectangular first pet toy arm end is affixed to the elongated first pet toy arm distal end such that the rectangular first pet toy arm end central axis is perpendicular to elongated first pet toy arm, f. a rectangular second pet toy arm end affixed to the elongated second pet toy arm distal end, the elongated second pet toy arm end having a rectangular second pet toy arm end central axis, wherein the rectangular second pet toy arm end is affixed to the elongated second pet toy arm distal end such that the rectangular second pet toy arm end central axis is perpendicular to elongated second pet toy arm, and g. a rectangular third pet toy arm end affixed to the elongated third pet toy arm distal end, the rectangular third pet toy arm end having a rectangular third pet toy arm end central axis, wherein the rectangular third pet toy arm end is affixed to the elongated third pet toy arm distal end such that the rectangular third pet toy arm end central axis is perpendicular to elongated third pet toy arm.

11. The spinnable pet toy according to claim 10, wherein the first pet toy arm end is oblong shaped, and wherein the first pet toy arm end is affixed such that the first pet toy arm end central axis is perpendicular to the central axis of the central hub.

12. The spinnable pet toy according to claim 11, wherein the first pet toy arm end includes a cavity.

13. The spinnable pet toy according to claim 11, wherein the central hub is tapered.

* * * * *